E. C. WILEY.
DRAFT REGULATOR.
APPLICATION FILED NOV. 8, 1915.
1,208,432.
Patented Dec. 12, 1916.
4 SHEETS—SHEET 2.
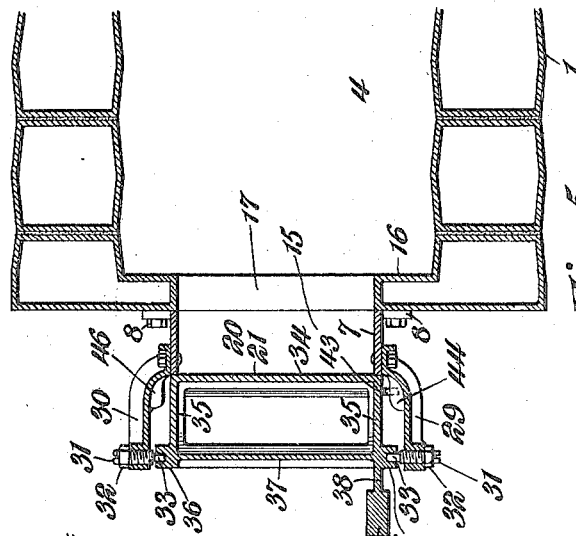
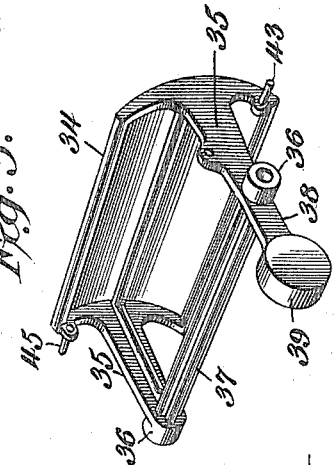
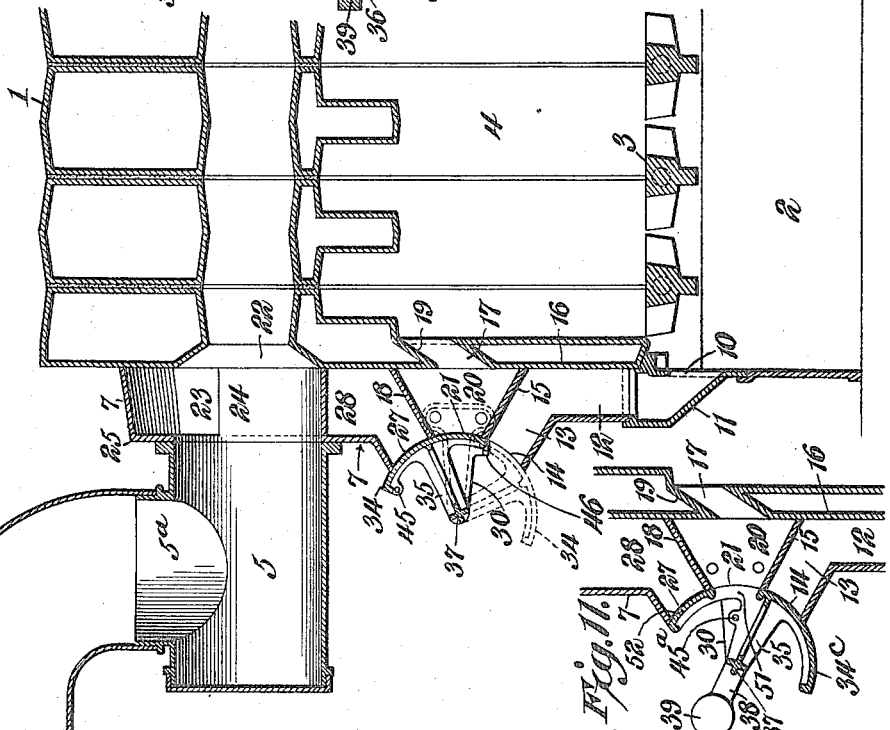
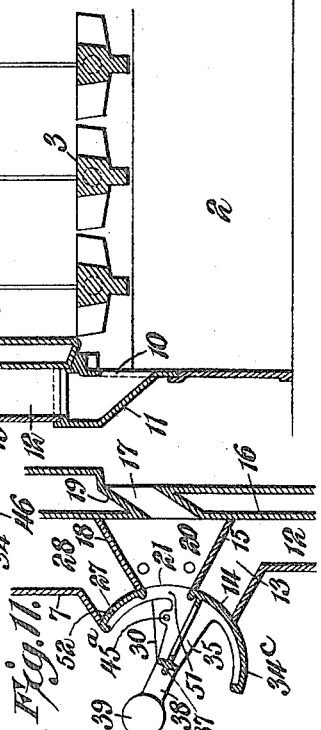
WITNESSES:
Howard D. Orr
H. T. Chapman
Edgar C. Wiley, INVENTOR,
BY E. G. Siggers
Attorney

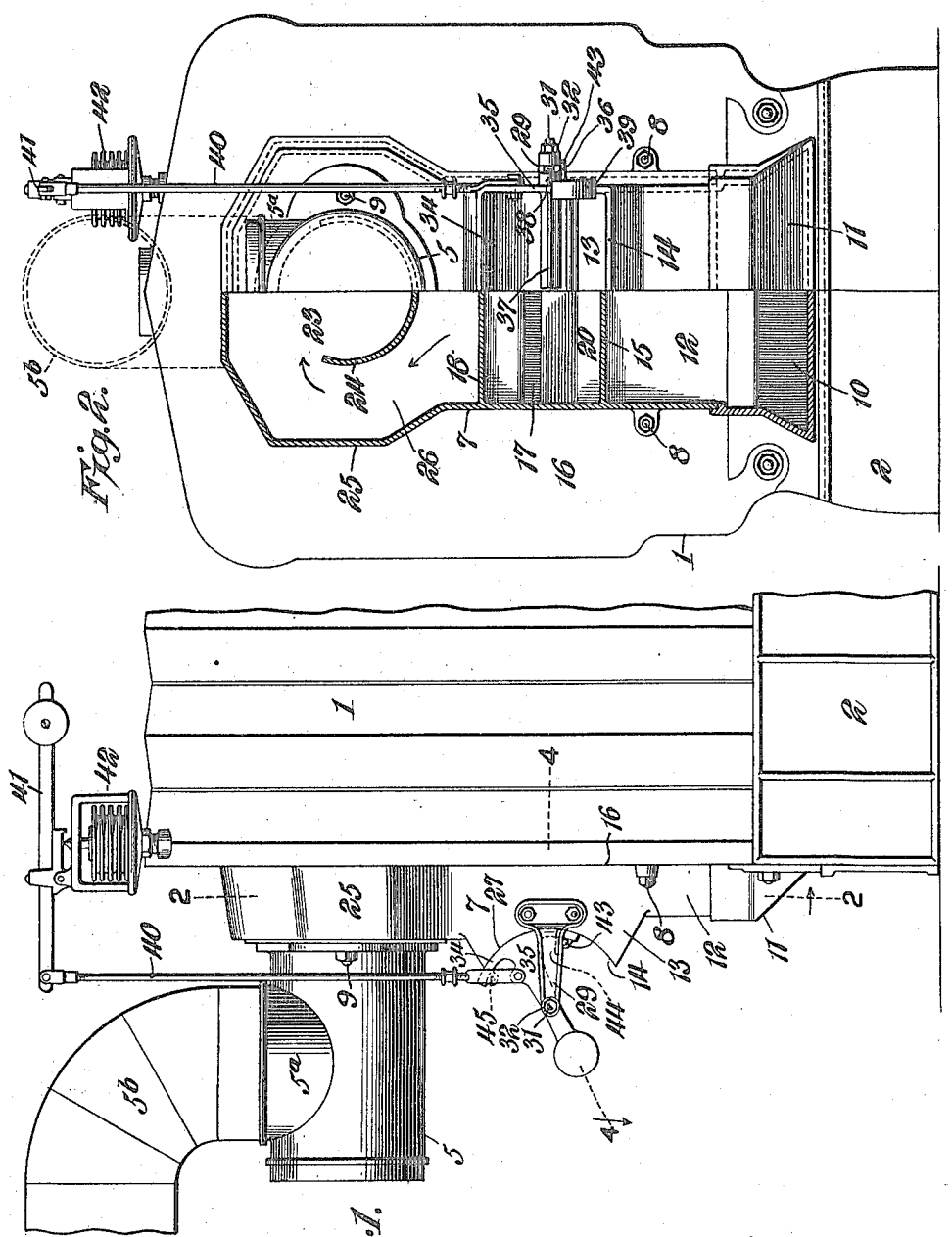

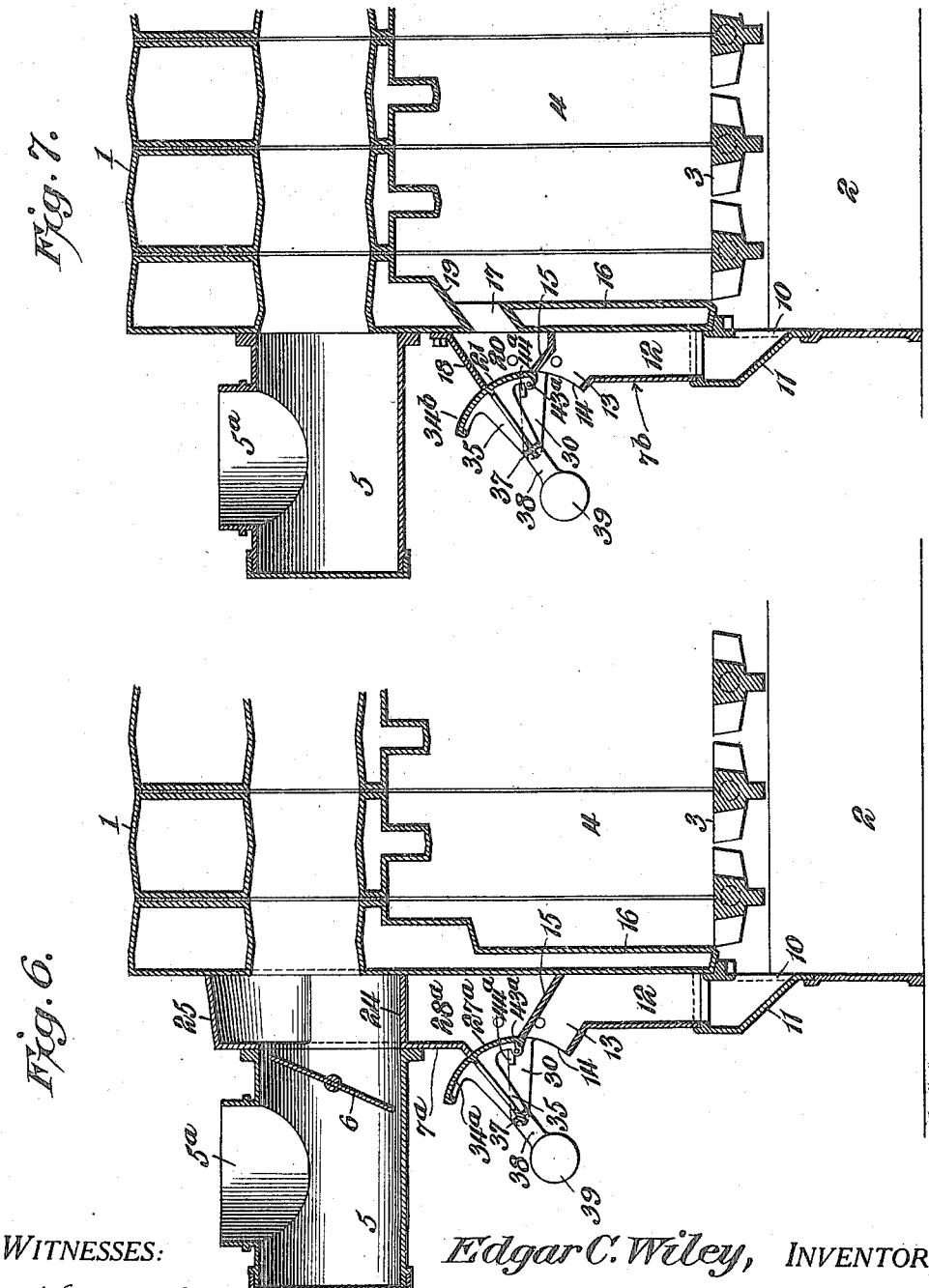

E. C. WILEY.
DRAFT REGULATOR.
APPLICATION FILED NOV. 8, 1915.
1,208,432.
Patented Dec. 12, 1916.
4 SHEETS—SHEET 4.
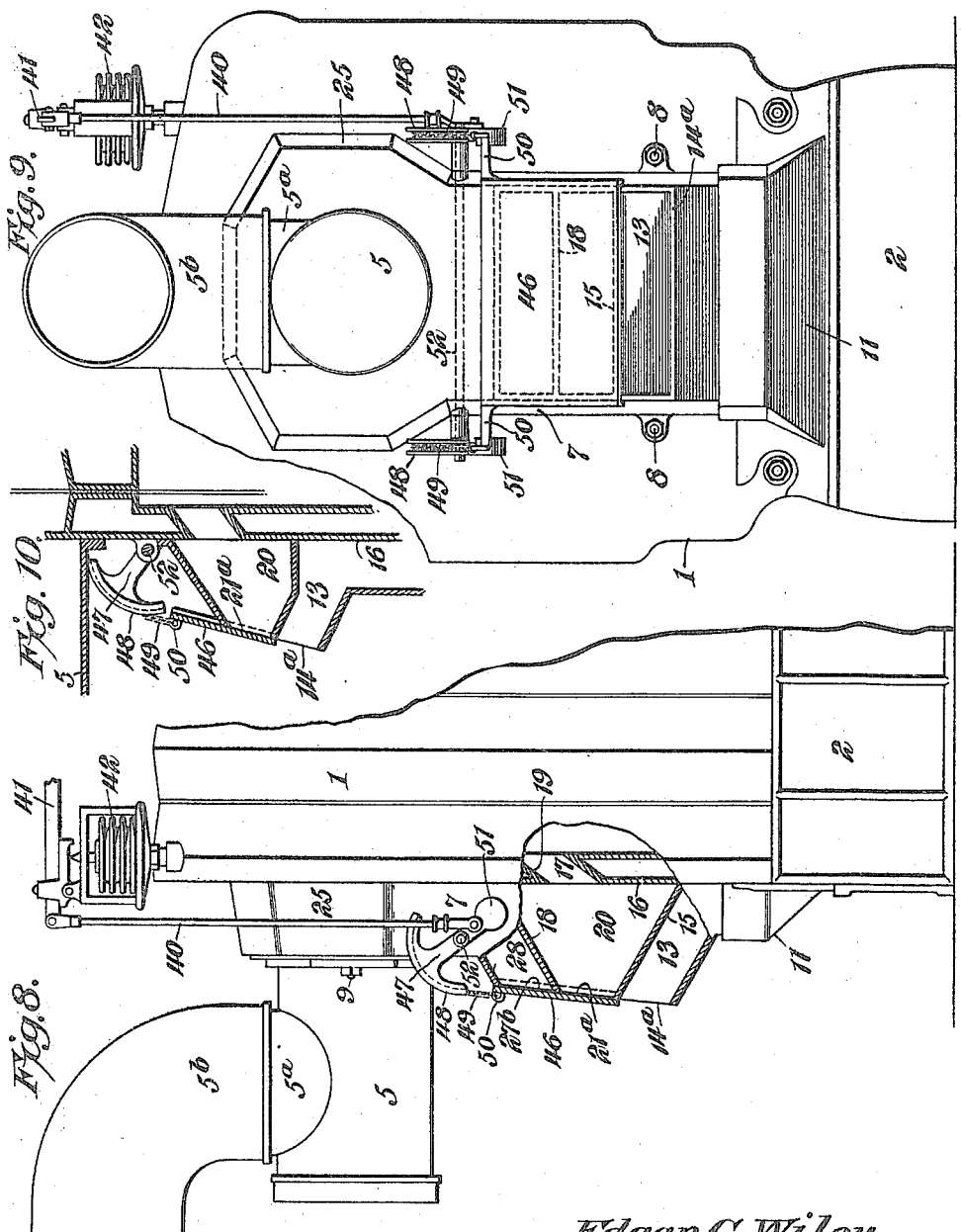
WITNESSES:
Howard D. Orr
H. T. Chapman
Edgar C. Wiley,
INVENTOR,
BY
Attorney

UNITED STATES PATENT OFFICE.

EDGAR C. WILEY, OF LYNCHBURG, VIRGINIA, ASSIGNOR OF ONE-THIRD TO ERNEST J. F. WILSON, OF LYNCHBURG, VIRGINIA.

DRAFT-REGULATOR.

1,208,432. Specification of Letters Patent. Patented Dec. 12, 1916.

Continuation of application Serial No. 13,894, filed March 12, 1915. This application filed November 8, 1915. Serial No. 60,306.

*To all whom it may concern:*

Be it known that I, EDGAR C. WILEY, a citizen of the United States, residing at Lynchburg, State of Virginia, have invented a new and useful Draft-Regulator, of which the following is a specification.

This invention has reference to draft regulators and its object is to provide a draft regulator for furnaces and the like, whereby the heat variations may be kept at a minimum and the heat curve be maintained noticeably free from marked variations.

In systems of heating known as vapor systems the vapor or steam pressure is low and the variations are measured by ounces rather than pounds, wherefore the regulation must be particularly delicate.

It is customary to regulate the draft to the ash pit and an air check to the smoke flue of the furnace, and this is frequently done by a regulator responsive to boiler pressure connected to the draft dampers or doors by various means, the most common of which are chains. Such regulating means are open to various objections. The chains are often in the way and frequently become broken, wherefore the regulating means are put out of service and regulation is very irregularly accomplished by the haphazard method of manually opening and closing the draft-controlling devices. Moreover, it frequently happens that a more delicate system of regulation is required than a system depending upon ash-pit and smoke-flue air checks, because in vapor systems of heating such regulation is found to be too sluggishly responsive to keep down the variations of pressure to ounces.

The present invention contemplates great delicacy of regulation by the admission to or cutting off of air direct from the atmosphere to the combustion chamber, with similar regulation of air with respect to the ash pit and smoke flue. Such admission to and cutting off of the air with respect to the ash pit, smoke flue and combustion chamber is, by the present invention, performed in order so that by first admitting air to the ash pit a suitable draft is produced for starting up a fire, and after the fire has attained a sufficient headway the air to the ash pit is checked and the draft is lessened by the admission of air directly to the smoke flue. Oftentimes, however, the checking of the fire by such means is not sufficiently rapid and there is still sufficient heat in the fire to produce a greater rise in pressure within the boiler than is desirable. To overcome this surge of heat air is admitted directly from the atmosphere to the fire chamber above the fire bed, whereby the heat of the fire is correspondingly checked by the admission of cold air and the tendency to a rising surge of heat and pressure is avoided.

In some types of boilers the use of air control for the ash pit and smoke flue is sufficient. In other types of boilers the control of air to the ash pit and combustion chamber above the fire bed is sufficient. In other types of boilers all three kinds of air control are desired.

The present invention contemplates the use of a simple type of casting adaptable to the rear end of the boiler where it is out of the way of interference with the proper management of the boiler, which casting by simple changes in its construction may be employed for any one of three different arrangements of draft control named.

The invention will be best understood from a consideration of the following detailed description, taken in connection with the accompanying drawings forming part of this specification, with the further understanding that while the drawings show a practical form of the invention, the latter is not confined to any strict conformity with the showing of the drawings, but may be changed and modified so long as such changes and modifications come within the scope of the appended claims.

In the drawings: Figure 1 is a side elevation of the rear end of a furnace arranged in accordance with the present invention for the triple control of the draft. Fig. 2 is a rear end elevation of the structure of Fig. 1 with one half of the draft casting shown in section on the line 2—2 of Fig. 1. Fig. 3 is a central vertical front to rear section of the structure of Fig. 1. Fig. 4 is a detail section on the line 4—4 of Fig. 1. Fig. 5 is a perspective view of the rockable damper shown in the preceding figures. Fig. 6 is a section similar to Fig. 3 showing a structure wherein the ash pit and smoke flue drafts only are employed. Fig. 7 is a section similar to Figs. 3 and 6, but showing a construction where the ash pit and combustion chamber drafts only are employed. Fig. 8 is a side elevation, with parts broken away, of an arrangement similar to that of Fig. 1 and associated figures, but illustrating a somewhat different form of damper plate. Fig. 9 is a rear elevation of the structure of Fig. 8. Fig. 10 is a fragmentary section of a structure like that of Fig. 7 with a flat damper plate. Fig. 11 is a section similar to Fig. 3, but showing a portion only of the draft regulator structure and illustrating a somewhat modified form of valve or damper.

Referring to the drawings there is shown a furnace 1 which may be taken as typical of a heating furnace adaptable for use in a vapor heating system, such, for instance, as is customarily employed in residences and other buildings, although the present invention may be used wherever regulation of the kind for which it provides is desirable. The furnace is provided with the usual ash pit 2, grate 3, fire or combustion chamber 4 and smoke pipe connection 5, except that the smoke flue or smoke pipe connection in some forms of the invention has some modifications to which reference will hereinafter be made. In the construction of smoke flue connection 5 shown in Fig. 6 an ordinary butterfly damper 6 is provided, it being understood that while in the other forms of the invention shown in others of the figures no butterfly damper is illustrated, such damper may or may not be provided.

In the more elaborate embodiment of the invention shown in Figs. 1 to 5 there is a casting 7 applied to the rear wall of the furnace, being connected thereto by bolts 8, 9. The rear end of the ash pit 2 has an opening 10 to which is applied an elongated casting 11 with a slanting bottom and constituting the lower end of an air flue leading into the ash pit, so that the ash pit draft is through the rear end of the ash pit instead of at the customary ash pit door. The box-like casting 7 has its lower end entering the casting 11 and within the casting 7 is a flue or passageway 12 having an angle continuation 13 opening to the atmosphere through a port 14 at a suitable height. The flue 12 with its continuation 13 and port 14, together with the passageway through the casting 11, constitutes the ash pit draft flue which is controlled in a manner to be described.

At the upper end of the draft flue 12 and forming the top wall of the flue 12 and its continuation 13 is a web 15 slanting upwardly from the rear wall of the furnace represented in the particular structure shown in the drawings by the rear section 16 of the furnace, which rear section defines the rear wall of the combustion chamber 4 and through which rear wall is a passageway 17 leading to the casting 7 above the web 15 and below another web 18 at a higher point than the web 15. The passageway 15 or flue 17 slants upwardly from the exterior of the furnace into the combustion chamber 4 in such manner that the upper wall of the flue 17 shown at 19 interposes between the bed of burning fuel on the grate 3 and the web 18, so that direct radiation of heat from the burning fuel cannot effect the interior of the flue or the casting 7 where open to the flue 17. The webs 15 and 18 constitute the top and bottom wall of a chamber 20, which, together with the flue 17, constitutes an air flue for the passage of atmospheric air directly into the combustion chamber 4 at the rear thereof, but at a high point therein, the flue 20 having a port 21 opening to the atmosphere at the rear of the furnace. The flue 17 is made of sufficiently large capacity to admit air in such quantities to the combustion chamber 4 and so localized as to the combustion chamber as to cause a chilling of the fire serving to deaden the fire instead of acting to increase combustion by the admission of many small streams of air as is sometimes provided for increasing the combustion of the fuel.

The casting 7 is continued to a sufficiently high point to cover the smoke flue opening of the body of the furnace, which opening is indicated at 22, and the casting is there widened to admit of the attachment of the smoke pipe connection 5. The bolts 9 replace the bolts ordinarily employed for holding the smoke pipe connection 5 to the rear of the furnace and by having the bolts 9 sufficiently long they serve the double purpose of holding the smoke pipe connection 5 to the casting 7 and the latter to the rear of the furnace. The casting 7 where coinciding with the furnace smoke outlet 22 and the connection 5 has a through passage 23 in which is located a baffle 24, which may be conveniently made as a part of the casting 7 and is in the form of a trough bridging the space between the rear wall of the furnace and the rear wall of the casting 7. The upper end 25 of the casting 7 is widened sufficiently to accommodate the baffle 24 and provide passageways or flues 26 on opposite sides thereof for the entrance of air into the smoke pipe connection 5 over the upper edges of the trough-like baffle 24, such air entering through a port 27 in the casting 7 immediately adjacent to and above the port 21 and opening into a flue 28 constituting the smoke-pipe air-check flue. The casting 7, therefore, provides an ash pit draft flue, a smoke pipe air check flue, and a combustion chamber air check flue all closely adjacent.

Secured to opposite sides of the casting 7 at that portion of the casting having the group of air flues are bracket arms 29, 30, respectively. These bracket arms project beyond the rear wall of the casting 7 and at their free ends carry adjustable pintles 31 which may be in the form of screws adapted to receive lock nuts 32 and having the ends remote from those receiving the lock nuts formed into journal pins 33. The walls of the ports 14, 21 and 27 are cylindrically concave, the curvature being about the axis of the journal pins 33 which are carried by the outer ends of the arms 29 and 30 and project one toward the other in alinement. Adapted to the concave walls of the flue ports is a convex damper plate 34, shown separately in Fig. 5 and also shown in the other figures of the drawing. This plate is of web and flange construction for strength and lightness, and is provided at opposite ends with radial supporting arms 35, each terminating at the center of curvature of the outer wall of the plate 34 in a socket boss 36 adapted to receive a respective one of the journal pins 33. The two arms 35 are joined at the ends provided with the bosses 36 by a cross bar 37 whereby the arms are suitably united and strengthened. One of the arms has a continuation 38 terminating in a counterweight 39. The cross bar 37 in stiffening and strengthening the arms 35 permits the mounting of the damper in a lathe or other machine for truing the outer face of the plate 34, so that it may fit snugly into the concave of the mouths of the ports 13, 21 and 27. In this way the damper may be made to fit the ports snugly yet freely, so that leakage at the ports is reduced to a negligible minimum. The damper may be controlled in any suitable or convenient way, and in the drawings it is indicated as connected by a rod 40 to a counterweight lever 41 under the control of a pressure structure 42 connected to the boiler for operation by pressure generated therein. The pressure responsive device 42 forms no part of the present invention, and therefore no description is given of such structure and the showing of the drawings may be taken as indicative of any suitable type of pressure responsive device. The arrangement is such that when the boiler is cold or when there is not sufficient pressure within the boiler, the damper or valve 34 is at its highest position wherein it covers the ports 21 and 27 leaving the port 14 fully open. This represents what may be termed the uppermost limit of movement of the damper, and in order to prevent any higher movement of the damper from any cause, the plate 34 has a pin 43 projecting therefrom in position to strike a lug 44 cast on the arm 29. When pressure is established within the boiler and increases sufficiently the pressure responsive device 42 is caused to act in a manner to move the damper or valve plate 34 about its axis of rocking represented by the journal pins 33. The plate 34 is then moved across the port 14 beginning to close the latter, thus checking the draft to the ash pit and correspondingly checking the draft to the fire. After the port 14 has been partly closed the plate 34 begins to uncover the port 27, and as the pressure within the boiler continues to rise the port 14 is fully covered and the port 27 continues to open until fully uncovered, thus admitting atmospheric air directly into the smoke flue connection 5, whereby after the admission of air to the ash pit through the port 14 has ceased the effect of draft through the smoke flue is checked to greater and greater extents by the increasing opening of the port 27, until the latter becomes fully opened, the port 14 remaining closed.

It quite often happens that even with the marked diminution of effectiveness of the smoke flue draft by virtue of opening the by-pass around the furnace represented by the air check flue 28, the heat of the fire is not thereby promptly checked, but the generation of vapor or steam continues and the pressure within the boiler increased. In such event the valve or damper 34 is moved to a greater extent than that sufficient to open the port 27, whereupon the port 21 is uncovered to an extent corresponding to the increased movement of the valve 34. This permits air to enter the flue 17 to be distributed through the combustion chamber 4 over the bed of burning fuel, and this air being admitted in considerable quantity produces a chilling blanket over the burning fuel operating to quickly check the fire, and also acting upon the walls of the combustion chamber to correspondingly chill the fluid within the boiler. The result is that the tendency for a rise of pressure within the boiler is very rapidly checked.

The ports 14, 27 and 21 are controlled in the order named with the port 27 opening before the port 14 is fully closed and the port 21 opening after the port 27 is fully opened. In the reverse order the port 21 is closed completely before the closure of the port 27 commences, and the port 14 begins to open before the port 27 is fully closed. When the fire is low, or when the fire is first built, the port 14 is fully open with the ports 27 and 21 fully closed, so that the fire then has the full benefit of the draft through the grate. Under such circumstances the fire increases in intensity with a corresponding increase in pressure in the boiler until such pressure is sufficient to operate the damper or valve 34 to cut down the ash pit draft and check the intensity of draft through the smoke flue by the admission of air into the smoke flue through the flue 28. The action of the air check to the combustion chamber is rapid, so that such air check serves to prevent any marked rise of pressure as soon as it comes into operation, wherefore the function of the air check to the combustion chamber is to maintain the pressure attained by the use of the smoke pipe air check very close to the pressure permitted by the smoke pipe air check. The result is that the pressure maintained in the boiler is very close to a uniform pressure, variations being measured by ounces rather than pounds, and such a condition is advantageous in vapor systems of heating. The effect of the air check to the combustion chamber is to neutralize all tendency of surging rises of pressure and temperature.

In Fig. 6 there is shown a casting $7^a$ which in most respects is similar to the casting 7, so that where the parts of the structure shown in Fig. 6 correspond to those of Fig. 1 and associated figures the same reference characters are employed. The casting $7^a$ has a flue 12, with a continuation 13 and port 14 and a web 15, all as in Fig. 1 and associated figures. The casting also has an expanded portion 25 with a baffle 24 therein and carries a smoke pipe connection 5, as in Fig. 1 and associated figures. Since in Fig. 6 the web 18 of the previously described structure is omitted, there is a smoke pipe air check flue $28^a$ with a port $27^a$ separated from the port 14 by the web 15. In the structure of Fig. 6 no air check to the combustion chamber is provided, and consequently the ports 14 and $27^a$ are controlled by a curved damper or valve plate $34^a$ of less circumferential extent than the plate 34, but otherwise the valve $34^a$ is similar to the valve 34 and corresponding reference numerals are used for the corresponding parts.

In the structure of Fig. 6 but two draft flues are employed, one being the ash pit draft flue 12 and the other the air check flue $28^a$ to the smoke pipe connection. For some purposes such an arrangement is all that is needed, since in some types of boilers it is not convenient to provide the air check to the combustion chamber. However, the structure of Fig. 6 permits the use of the damper or valve shown separately in Fig. 5, which damper is located outside of the flue casting 7 or $7^a$, and hence does not in any manner interfere with the full effect of the air flues, and is at all times accessible without the necessity of dismantling any part of the furnace. The valve or damper 34 or $34^a$, as the case may be, being placed at the rear of the furnace is wholly out of the way and hence is not liable to damage because it projects beyond the furnace or the flue casting carrying it. In the structure of Fig. 6 the flue casting $7^a$ carries the smoke pipe connection 5 and is otherwise similar to the flue casting 7.

In the structure of Fig. 7 there is a flue casting $7^b$ which, with the exception of the smoke pipe air check valve 28 and the expanded upper end 25, is similar to the flue structure 7 of Fig. 1 and associated figures. There is an ash pit flue 12 with a continuation 13 and port 14, and a chamber 20 with a bottom wall 15 and top wall 18. Also communicating with the chamber 20 is a flue 17 leading into the combustion chamber 4. The chamber 20 has a port 21 immediately adjacent to the port 4 as in the structure of Fig. 1 and associated figures. Since the port 27 is omitted in the structure of Fig. 7 and the port casting has no connection with the smoke flue, the casting $7^b$ extends no higher than the wall 18, while the damper or valve controlling the ports 14 and 21 and shown at $34^b$ is similar to the valve $34^a$ and except for circumferential length is the same as the structure described with particular reference to Fig. 5. In the structure of Fig. 7 checking air is introduced into the fire chamber without being preceded by checking air introduced into the smoke flue. For some purposes this is to be preferred to the structure of Fig. 1 and associated figures.

In order to prevent a movement of the valve or damper 34 to too great an extent in a direction to open the checking ports, a stop pin 45 is provided on the damper in position to engage a lug 46 on the arm 30, especially in the structure shown in Fig. 1 and associated figures. Of course, the relative positions of the lugs and stop pins may be reversed, as in Figs. 6 and 7, since the pin $43^a$ is at the opposite end of the plate 34 remote from that shown in the preceding figures, and a lug $44^a$ is carried by the arm 30 instead of the arm 29, but it will be understood that the pins and lugs may be placed at either end of the damper or plate 34 or $34^a$ or $34^b$, so that the limit of movement of the plate may be restricted without regard to the length of travel of the pressure responsive device 42.

The smoke pipe connection 5 is shown in the drawings as having a top outlet $5^a$ for a smoke pipe $5^b$, but it will be understood that other forms of connection commonly employed in furnaces may be used. The baffle 24 prevents ready access of soot or other material to the flue 28 or $28^a$.

While the draft regulator of the present invention is more particularly intended for heating systems of the vapor type, it is useful in connection with other types of heating systems whether hot air, steam or hot water.

The draft flue casting 7, $7^a$ or $7^b$ is or may be a one-piece structure adaptable to existing furnaces, as well as readily made for inclusion in boilers as first built. The controlling device represented by the damper or valve 34, $34^a$ or $34^b$ is a unitary structure whether actually in one piece or not.

In the structures described with reference to Figs. 1 to 7 the damper plate and the mouths of the ports controlled by the damper plate are rounded in such manner that the damper plate is convex and the mouths of the associated air ports are concave. While this is the preferred construction certain advantages are obtainable by making the mouths of the associated ports all in one plane and the damper plate flat or plane. The last-named arrangement of ports and damper plates are shown in Figs. 8, 9 and 10. Figs. 8 and 9 correspond in the construction shown to that of Figs. 1 to 4 and where the parts are alike the same reference numerals are applied to Figs. 8 and 9 as are applied to Fig. 1 and associated figures. The difference in the construction of Figs. 8 and 9 over that of Fig. 1 and associated figures is in the arrangement of the air ports and in the damper construction. In the construction of Figs. 8 and 9 the air duct 13, the air duct or chamber 20 and the air duct 28 are suitably shaped so that the ports where these air ducts open into the atmosphere are in one plane, the ports being indicated at 14$^a$, 21$^a$ and 27$^b$, respectively. The plane of the ports inclines to a small degree from the vertical when the parts are in the installed position, the upper end of the plane being closer to the rear wall of the furnace than the lower end. Adapted to the ports 14$^a$, 21$^a$ and 27$^b$ is a damper plate 46 made flat or plane where covering the ports. On opposite sides of the casting 7 are rocker levers 47 each with one end in the form of an arm 48 carrying a chain 49 connected to a lug or pin 50 projecting from the corresponding side of the plate 46 at or near its upper end. Each rocker arm 47 has a counterweight 51 at the end remote from the arm 48 and the arms are mounted on a shaft 52 so that the two arms synchronize in movement. The furnace of Figs. 8 and 9 is shown as provided with a pressure responsive device 42, lever 41 and connecting rod 40 by means of which the rocker arms 47 are actuated in accordance with variations in pressure, so that the damper plate 46 responds to variation in pressure in the boiler the same as the damper 34 of the structure shown in Fig. 1 and associated figures.

By having the air ports in one plane and the damper plate flat the parts are very readily machined or otherwise finished true. With the plane of the ports slightly inclined with respect to the vertical the damper will readily slide with relatively little friction and is particularly free from liability of sticking on account of corrosion. The inclination need be only a very few degrees, just enough to insure good contact and small enough to make the damper work with comparative freedom.

In Fig. 10 the application of the flat damper plate to a structure such as shown in Fig. 7 is indicated and the same reference numerals as are applied to Figs. 8 and 9 are applied to the structure of Fig. 10. The flat damper plate may be as readily applied to the structure of Fig. 6 and its application is so obvious that it is not deemed necessary to illustrate it. The operation of the structure provided with a flat damper plate is with respect to the control of the fire the same as has been described with reference to the curved damper plate.

In Fig. 11 there is shown a valve or damper 34$^c$ similar to the damper 34 of Fig. 3, but having a greater circumferential extent and provided with an intermediately located port or passage 51 of a size corresponding to either port 21 or 27, these two ports being customarily of the same area. With such a construction the damper of Fig. 11 if considered to be in position to simultaneously cover the ports 21 and 27 with the port 14 open will then have the port or passage 51 and the remainder of the damper above the port 27. If, now, the damper be turned upon its axis of rocking in the manner described with reference to the damper 34, the port 14 will be gradually closed and the port 27 has gradually opened until the port 14 is fully closed and the port 27 is fully open, so that the air draft to the ash pit is checked and the check draft to the smoke flue is opened, the port 51 then coinciding with the port 27 and the port 21 still remaining closed. On a further movement of the damper 34$^c$ in the same direction as just considered, the port 51 is moved into coincidence with the port 21, while the remainder of the damper indicated at 52 is moved into covering relation to the port 27, wherefore as the port 21 is opened the port 27 is closed to a like extent, the port 14 still remaining closed.

The purpose of this construction is to increase the draft through the port 21 by correspondingly closing the check draft to the smoke flue. If the smoke flue draft remains fully open, while the check draft to the combustion chamber is being opened, the force of the check draft to the combustion chamber is correspondingly reduced because of the shunting of air into the smoke flue. By closing the check draft to the smoke flue as the check draft to the combustion chamber is opened, the force of the draft through the combustion chamber is correspondingly increased, and its action upon the fire in chilling it is correspondingly more rapid.

The structure of Fig. 11 is applicable to the structure of Fig. 1 and associated figures and in principle is applicable to the structure of Figs. 8 and 9, the only change necessary being to make the damper flat instead of curved.

It will be observed that in all the constructions the damper or damper plate is wholly outside of the air ducts or flues and the air ports and the operating mechanisms for the damper plates are also wholly outside of any air ports, flues or ducts, so that these air flues are fully efficient throughout their entire area.

This application is a continuation of my application No. 13,894, filed March 12, 1915.

What is claimed is:—

1. A draft regulator for furnaces comprising a duct structure including a plurality of ducts leading individually from the atmosphere to different parts of the furnace for draft and air check purposes and terminating at the atmospheric ends in ports in close association and individual to the respective ducts, said ports having their atmospheric ends defining an arc described about a common center, and a unitary valve or damper common to the ports having a port-controlling face movable concentric with and situated exterior to said curved ports.

2. A draft regulator for furnaces comprising a casting with a plurality of separate ducts therein leading to different parts of the furnace with the ducts terminating in adjacent ports individual to respective ducts and having concave mouths curved about a common axis, and a unitary valve or damper common to the ports and mounted to rock about the axis of curvature of the mouths of the ports and provided with a convex face concentric with the mouths or openings of the ducts, the valve or damper being exterior to the casting containing the ducts.

3. A draft regulator for furnaces having a plurality of separate ducts leading to different parts of the furnace and at the ends remote from the furnace opening individually and directly to the atmosphere, the atmospheric ends of the ducts being grouped in close association and having a concave curvature about a common axis exterior to the ducts, and a valve or damper exterior and common to the ducts and provided with a convex face movable across the ducts to control the admission of air thereto.

4. A draft regulator for furnaces having air ducts leading to the ash pit, smoke flue and combustion chamber and including a damper structure for said air ducts having a range and direction of movement to cut off the admission of air to the ash pit, to admit air to the smoke flue and to then admit air to the combustion chamber in the order named.

5. A draft regulator for furnaces comprising an air duct leading to the ash pit, another air duct leading to the smoke flue, and another air duct leading to the combustion chamber and all located in adjacent relation one to the other, and a damper structure movable into opening and closing relation to the ducts and adapted and arranged to cut off the admission of air to the ash pit, to admit air to the smoke flue, and to them admit air to the combustion chamber in the order named.

6. A draft regulator for furnaces comprising air ducts leading to the ash pit, to the smoke flue, and to the combustion chamber of the furnace and all located at the rear of the furnace in adjacent relation one to the other, and a unitary damper structure movable with relation to the air ducts to cut off the admission of air to the ash pit, to admit air to the smoke flue and to then admit air to the combustion chamber all in the order named.

7. A draft regulator for furnaces comprising air ducts leading severally to the ash pit, the smoke flue and the combustion chamber of the furnace and having atmospheric connections grouped into adjacent relation, and a damper movable across the atmospheric ends of the air ducts to cut off the admission of air to the ash pit, to then admit air to the smoke flue and to then admit air to the combustion chamber, in the order named.

8. A draft regulator for furnaces comprising air flues having ports grouped adjacently with the air flues leading severally to the ash pit, the smoke flue and the combustion chamber of the furnace, and a rockable damper plate movable across the air ports to cut off the admission of air to the ash pit, to admit air to the smoke flue, and to admit air to the combustion chamber in the order named.

9. A draft regulator for furnaces comprising a series of air flues having adjacent air inlets, one flue leading to the ash pit, another flue leading to the smoke pipe connection of the furnace and another flue opening into the combustion chamber at a high point thereof, and a damper movable across the air inlets to the several flues to cut off the admission of air to the ash pit, to admit air to the smoke flue connection, and to admit air to the combustion chamber, in the order named.

10. A draft regulator for furnaces comprising a series of air ducts located at the rear of the furnace and severally communicating with the ash pit, smoke flue and combustion chamber of the furnace, and a rockable damper plate movable across the air inlets to the flues and constructed and arranged to have a normal tendency to move into closing relation to the air ducts leading to the smoke flue and combustion chamber and to open the flue leading to the ash pit, and means responsive to conditions within the furnace for moving the damper into closing relation to the ash pit flue and to open the duct leading to the smoke flue and the duct leading to the combustion chamber, in the order named.

11. A draft regulator for furnaces comprising a series of ducts at the rear of the furnace severally leading to the ash pit, smoke flue and combustion chamber of the furnace and having closely associated ports opening to the atmosphere with said ports curved upon a common axis, and a curved damper plate mounted to rock across the ports of the flues and constructed and arranged to move across said flues to close the duct leading to the ash pit, to open the duct leading to the smoke flue and to open the duct leading to the combustion chamber, in the order named.

12. A furnace provided at the rear portion with a flue structure having division walls therein dividing the flue structure into a series of individual chambers with one chamber communicating with the ash pit, another with the smoke flue, and another with the combustion chamber of the furnace at a high point of the rear thereof, said chambers in the flue structure having adjacent air ports leading to the atmosphere, and a unitary damper movable across the air ports to close the air inlet to the ash pit and to open the air inlets to the smoke flue and combustion chamber, in the order named.

13. A draft regulator for furnaces including an air check duct leading from the outside of the furnace and there provided with a valve or damper and passing through the wall of the furnace in an upward direction and opening into the combustion chamber near the top thereof at a point above the fuel level, whereby the upper walls of the duct throughout the greater portion of their length are protected by the lower walls of the duct from the direct action of heat rays coming from a fire within the combustion chamber.

14. A draft regulator structure for furnaces including a duct for admitting air to the ash pit of the furnace, and another duct for admitting air to the combustion chamber of the furnace, said ducts having closely adjacent ports individual thereto and separately opening to the atmosphere, and a valve or damper movable across the ports to close the flue leading to the ash pit and to open the flue leading to the combustion chamber, in the order named.

15. A draft regulator for furnaces comprising a duct structure including a plurality of ducts leading from the atmosphere to different parts of the furnace for draft and air check purposes, and at the atmospheric ends terminating in closely associated ports individual to the respective ducts, and a unitary valve or damper exterior and common to the ports and having a port-controlling face movable across the ports in predetermined order.

16. A draft regulator for furnaces comprising a duct structure including a plurality of ducts leading from the atmosphere to different parts of the furnace for draft and air check purposes, and at the atmospheric ends terminating in closely associated ports individual to the respective ducts, and a unitary valve or damper exterior and common to the ports and having a port-controlling face movable across the ports in predetermined order, one of the ducts leading into the combustion chamber at a high point therein and of a size to admit air in checking quantities.

17. A draft regulator for furnaces comprising a duct structure including a plurality of ducts leading from the atmosphere to different parts of the furnace for draft and air check purposes, and at the atmospheric ends terminating in closely associated ports individual to the respective ducts, and a unitary valve or damper exterior and common to the ports and having a port-controlling face movable across the ports in predetermined order, one of the ducts leading into the combustion chamber at a high point therein and of a size to admit air in checking quantities, and another one of the ducts leading to the ash pit for draft purposes.

18. A draft regulator for furnaces comprising a duct structure including a plurality of ducts leading to different parts of the furnace for draft and air check purposes, and at the atmospheric ends terminating in closely associated ports, and a unitary valve or damper exterior to the ports and having a port-controlling face movable across the ports in predetermined order, one of the ducts leading into the combustion chamber at a high point therein and of a size to admit air in checking quantities, and another one of the ducts leading to the ash pit for draft purposes, said draft regulator also having another one of the ducts leading to the smoke flue.

19. A draft regulator for furnaces having a plurality of separate flues leading respectively to the ash pit, the smoke flue and the combustion chamber of the furnace and at their atmospheric ends terminating in closely associated ports, and a unitary damper movable with relation to the ports to cut off the admission of air to the ash pit, to admit air to the smoke flue, and to then admit air to the combustion chamber, all in the order named, said damper having a continuation spaced from that part of the damper first active to cut off the admission of air to the smoke flue as air is admitted to the combustion chamber.

In testimony, that I claim the foregoing as my own, I have hereto affixed my signature in the presence of two witnesses.

EDGAR C. WILEY.

Witnesses:
J. I. MENEFEE,
E. J. F. WILSON.

Copies of this patent may be obtained for five cents each, by addressing the "Commissioner of Patents, Washington, D. C."